United States Patent
Lohman

(10) Patent No.: US 9,388,768 B2
(45) Date of Patent: Jul. 12, 2016

(54) BLOCKER DOOR ACTUATION SYSTEM AND APPARATUS

(71) Applicant: ROHR, INC., Chula Vista, CA (US)

(72) Inventor: Sarah Lohman, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 418 days.

(21) Appl. No.: 13/975,061

(22) Filed: Aug. 23, 2013

(65) Prior Publication Data

US 2015/0052875 A1 Feb. 26, 2015

(51) Int. Cl.
*F02K 1/72* (2006.01)
*F02K 1/76* (2006.01)

(52) U.S. Cl.
CPC ... *F02K 1/72* (2013.01); *F02K 1/76* (2013.01); *F02K 1/763* (2013.01); *F02K 1/766* (2013.01); *F05D 2260/50* (2013.01)

(58) Field of Classification Search
CPC ............. F02K 1/72; F02K 1/76; F02K 1/763; F02K 1/766
See application file for complete search history.

(56) References Cited

U.S. PATENT DOCUMENTS

| | | | | |
|---|---|---|---|---|
| 3,377,799 A * | 4/1968 | Geyer | ...................... | F01D 17/20 415/13 |
| 3,829,020 A * | 8/1974 | Stearns | ...................... | F02K 1/09 181/216 |
| 4,005,822 A * | 2/1977 | Timms | .................. | B64C 25/423 239/265.31 |
| 4,137,711 A * | 2/1979 | Montgomery | ............ | F02K 1/72 239/265.31 |
| 4,147,028 A * | 4/1979 | Rodgers | ..................... | F02K 1/72 239/265.29 |
| 4,462,207 A * | 7/1984 | Hitchcock | ................. | F02K 1/60 239/265.31 |
| 4,519,561 A * | 5/1985 | Timms | .................... | F02K 1/605 239/265.33 |
| 4,894,985 A * | 1/1990 | Dubois | ..................... | F02K 1/70 239/265.29 |
| 5,392,991 A * | 2/1995 | Gatti | ......................... | F02K 1/60 239/265.29 |
| 5,775,639 A * | 7/1998 | Fage | ......................... | F02K 1/60 239/265.29 |
| 5,893,265 A * | 4/1999 | Gonidec | .................... | F02K 1/70 239/265.33 |
| 6,094,908 A * | 8/2000 | Baudu | ....................... | F02K 1/70 244/110 B |
| 6,679,057 B2 * | 1/2004 | Arnold | .................... | F01D 17/12 415/158 |
| 6,684,623 B2 * | 2/2004 | Langston | .................. | F02K 1/76 239/265.29 |
| 2010/0078608 A1* | 4/2010 | Somerfield | ............. | F02K 1/763 254/103 |
| 2010/0126139 A1* | 5/2010 | Howe | .................... | F02K 1/1207 60/226.2 |
| 2011/0277448 A1* | 11/2011 | Roberts | .................. | B64D 29/06 60/226.2 |
| 2012/0138707 A1* | 6/2012 | Vauchel | .................. | F02K 1/763 239/265.29 |
| 2015/0056070 A1* | 2/2015 | Lacko | ....................... | F02K 1/70 415/214.1 |

* cited by examiner

*Primary Examiner* — William H Rodriguez
*Assistant Examiner* — Eric Linderman
(74) *Attorney, Agent, or Firm* — Snell & Wilmer, LLP

(57) ABSTRACT

A blocker door actuation system for use in an aircraft thrust reverser is provided. The blocker door actuation system may comprise a rack, a gear, a gear housing, a screw shaft, and a link. The blocker door actuation system may be mounted to a translating sleeve in an aircraft nacelle. In response to the thrust reverser being activated and the translating sleeve moving aft, the blocker door actuation system may move the blocker door from a stowed position to a deployed position in a fan air duct.

18 Claims, 6 Drawing Sheets

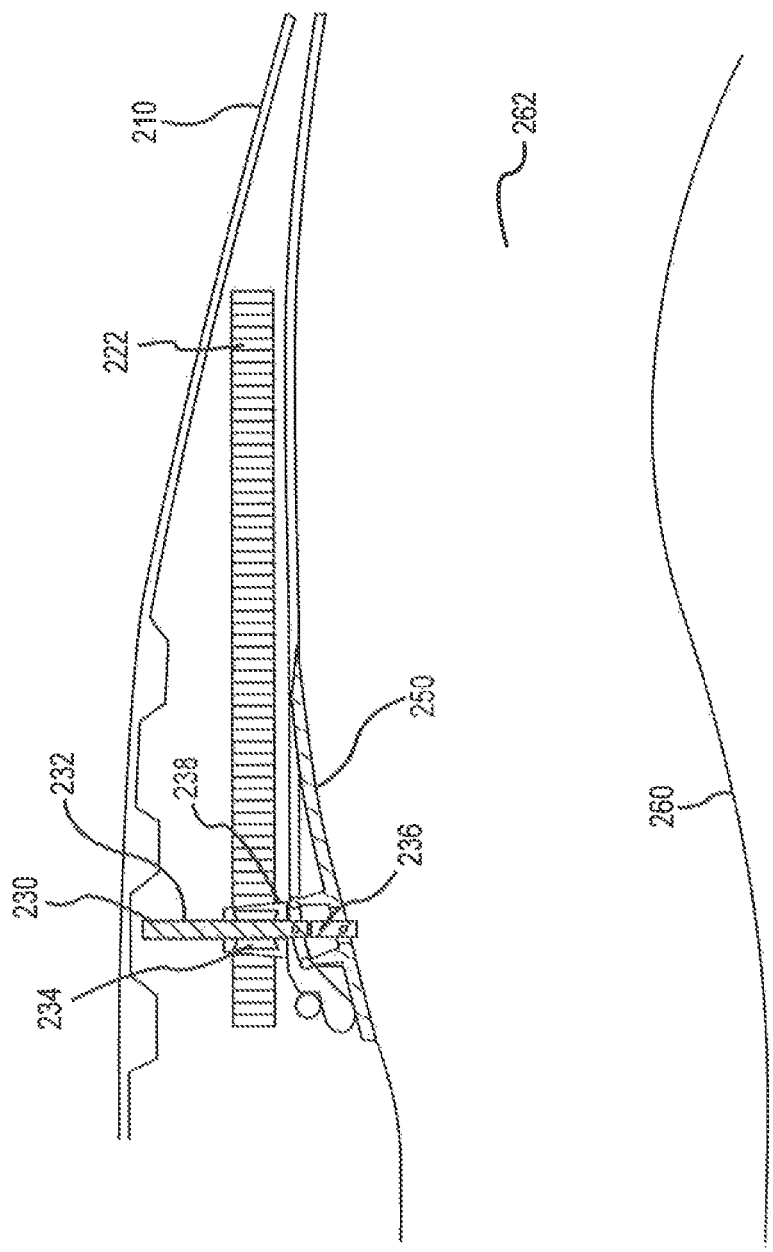

BLOCKER DOOR ACTUATION SYSTEM AND APPARATUS

FIELD

The present disclosure relates to thrust reverser actuation systems, and more particularly, to blocker door actuator systems in thrust reverser systems.

BACKGROUND

Thrust reverser systems are typically employed on engine aircraft to provide rear thrust during landing. These thrust reverser systems generally comprise a blocker door that may be actuated by a drag link system. Portions of the drag link system may be coupled to an inner fixed structure ("IFS") and/or a fan air duct. This drag link structure may introduce and/or create aerodynamic inefficiencies in the fan air duct during operating in a forward thrust mode. This drag link structure may also contribute to the noise created by the aircraft during operation.

SUMMARY

A thrust reverser system may comprise a translating sleeve and a blocker door actuation system. The blocker door actuation system may comprise a gear, a threaded shaft and a link. The threaded shaft may be rotatably received within the gear. The link may be coupled to an end of the threaded shaft. The blocker door may be rotatably coupled to the link. The blocker door may be actuated from a stowed position to a deployed position in response to the translating sleeve moving aft.

In various embodiments, an aircraft nacelle may comprise a translating sleeve, a blocker door actuation system, a rack, and a blocker door. The blocker door actuation system may comprise a gear and a screw shaft. The blocker door actuation system may be coupled to the translating sleeve. The rack may be configured to rotatably guide the gear. The blocker door may be operatively coupled to the blocker door actuation system. The blocker door may be configured to translate from a stowed position to a deployed position in response to the translating sleeve moving aft.

In various embodiments, a blocker door actuation system may comprise a rack, a gear, a gear housing, a screw shaft, and a link. The gear may be configured to rotatably translate along the rack. The gear housing may be configured to house the gear. The screw shaft may be operatively installed within the gear. The screw shaft may be configured to translate within the gear in response to gear translating along the rack. The link may be rotatably coupled to the screw shaft.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 2B-2D illustrate various cross-sectional views of a portion of a thrust reverser system in deployed positions, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the hack end) of an aircraft, or generally, to the direction of exhaust of the gas turbine. As used herein, "forward" refers to the directed associated with the nose (e.g., the front end) of an aircraft, or generally, to the direction of flight.

Typical cascade style thrust reverser systems may comprise drag link systems to actuate one or more blocker doors in response to the thrust reverser system being activated (e.g., the translating sleeve being moved aft). However, these draft link systems often including mounting hardware (e.g., brackets) that may be mounted in an engine fan air duct. The mounting hardware may affect the aerodynamic performance of the fan air duct, and/or may increase noise from the fan air duct. Moreover, the mounting hardware may introduce design considerations that affect the envelope and/or package of the nacelle, the fan air duct, the translating sleeve, and/or other components of the nacelle system.

In various embodiment's, a blocker actuation system may comprise an actuation system that is housed in and/or mounted to the translating sleeve. This arrangement may improve the aerodynamic efficiencies and may reduce the overall noise from the nacelle. In this regard, the system may replace components, such as, for example, one or more drag links and/or the associated mounting hardware.

Figure 1A:
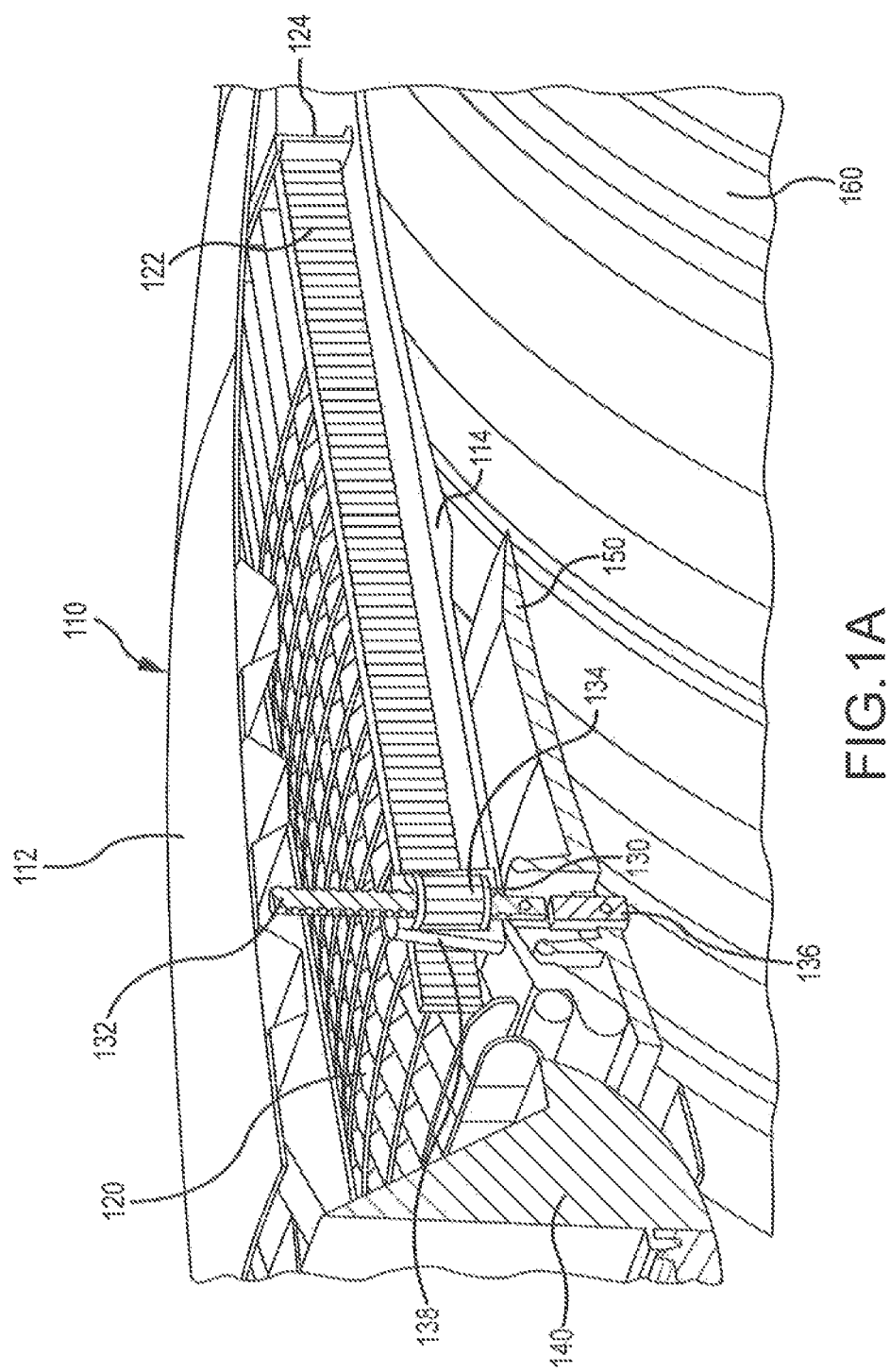
FIG. 1A illustrates a perspective cross-sectional view of a portion of a thrust reverser system in a stowed position, in accordance with various embodiments.
Figure 1B:
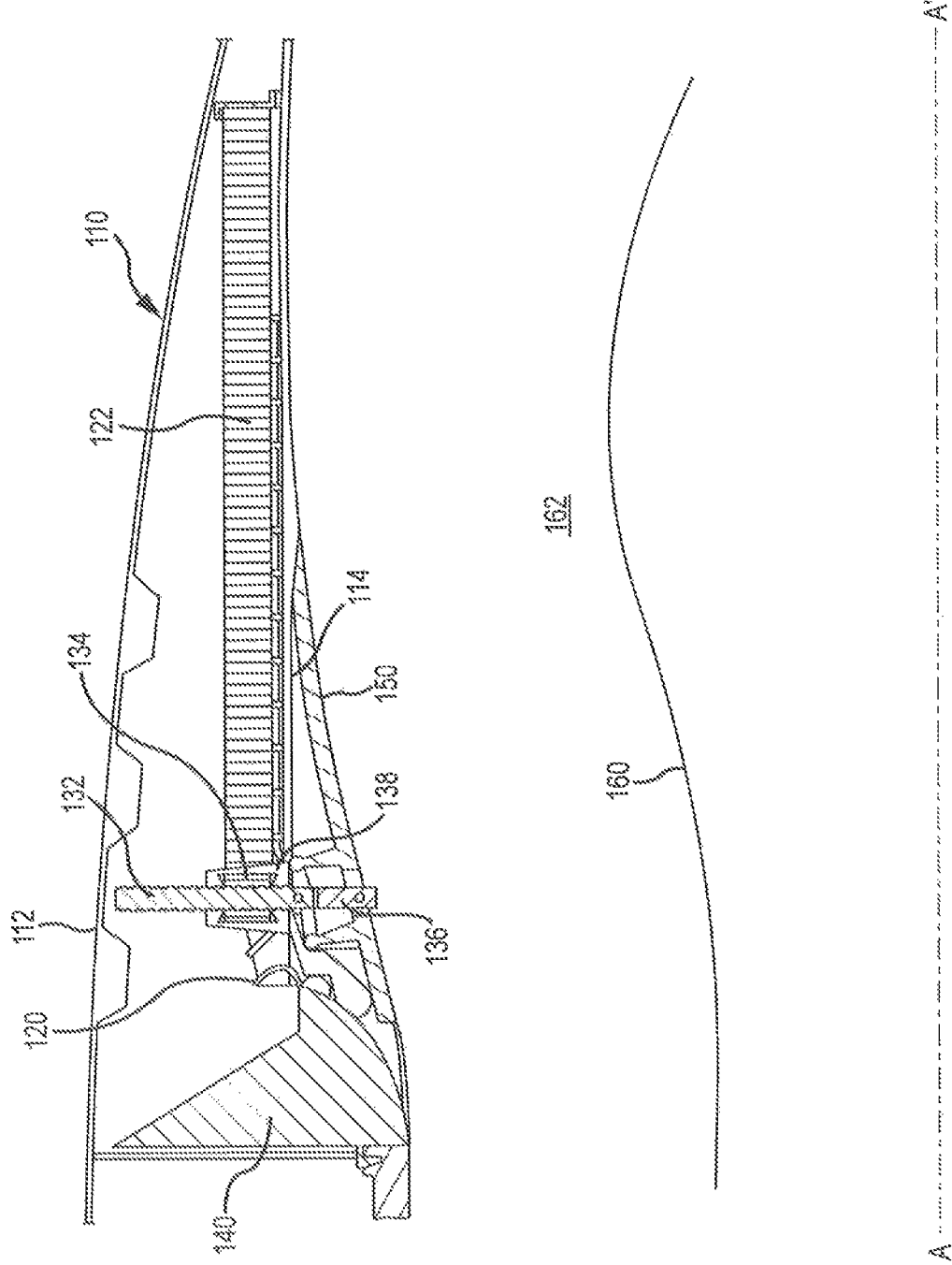
FIG. 1B illustrates a cross-sectional view of a portion of a thrust reverser system in a stowed position, in accordance with various embodiments.

In various embodiments, and with reference to FIGS. 1A and 1B, a thrust reverser system may generally comprise a translating sleeve 110, a cascade 120, a blocker door 150, and an inner fixed structure ("IFS") 160, which are shown in the stowed position in FIGS. 1A and 1B. Translating sleeve 110 may include an outer sleeve 112 and an inner sleeve 114. Translating sleeve 110 may make up an exterior portion of the nacelle. Translating sleeve 110 and IFS 160 may also define a channel and/or enclose a fan air duct 162, as shown in FIG. 1B. A fan, such as a turbofan, may conduct air from a nacelle inlet into fan air duct 162. Fan air duct 162 may be configured to conduct air produced by a fan (e.g., turbofan) during engine operation through the nacelle, exiting in an aft direction to provide aircraft propulsion.

In various embodiments, translating sleeve 110 may define a hollow cavity that houses cascade 120. Cascade 120 may be coupled to and/or supported by a torque box 140. Cascade 120 may further comprise a rack 122. Rack 122 may be coupled to and/or integrally formed in cascade 120. An aft portion of one or more cascades 120 may be coupled to and/or supported by an aft-cascade ring 224. The aft-cascade ring 124 may be configured to join one or more cascades 120 together in a hoop structure around a portion of an outer diameter of the nacelle.

In various embodiments, a blocker door actuation system 130 may be any system configured to actuate a blocker door 150 between a stowed position and a deployed position. A portion of blocker door actuation system 130 may be coupled to and/or mounted on translating sleeve 110. More specifically, gear housing 138 may be coupled to and/or mounted on inner sleeve 114.

Blocker door actuation system 130 may comprise a screw shaft 132 (e.g., a threaded shaft), a gear 134, and a link 136. Gear 134 may be further housed or protected by a gear housing 138. Screw shaft 132 may comprise one or more threads. Gear 134 may thread on screw shaft 132 and/or be configured to receive screw shaft 132. In this regard, in response to gear 134 rotating screw shaft 132 may translate into and/or away from centerline A-A' (e.g., the centerline of the engine and/or the nacelle), as shown in FIG. 1B. Gear 134 may be rotatably and/or operatively couples to rack 122.

In various embodiments, gear 134 may be any suitable gear including, for example a pinion gear. Moreover, gear 134 may be sized such that its rate of rotation corresponds to the rate of translation of translating sleeve 110 (e.g., the linear movement of the translating sleeve 110 corresponds to the rotational movement of the gear 134 and the liner movement of the screw shaft 132). Rack 122 may be any suitable gear path. Rack 122 may be a corresponding size to gear 134. In this regard, rack 122 may provide a path along which gear 134 rotates in response to aft movement of translating sleeve 110.

Figure 2A:
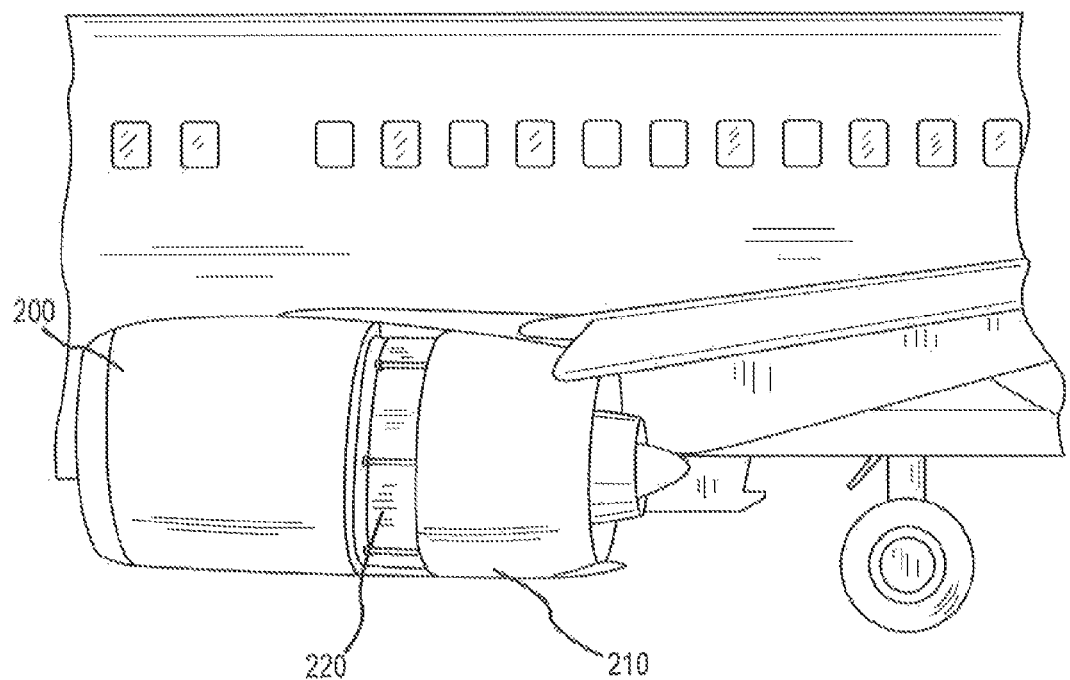
FIG. 2A illustrates a perspective view of a portion of an engine showing a nacelle comprising an engine with the thrust reverser system in a deployed position, in accordance with various embodiments.
Figure 2C:
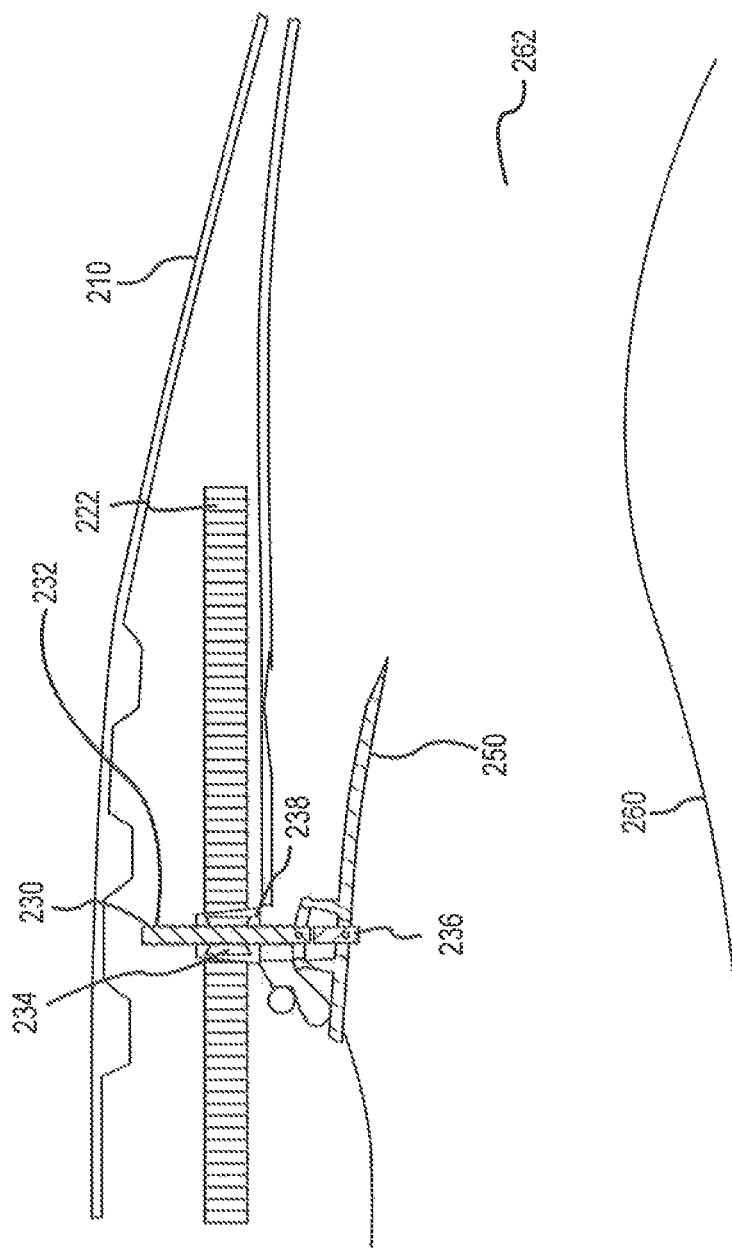
Figure 2D:
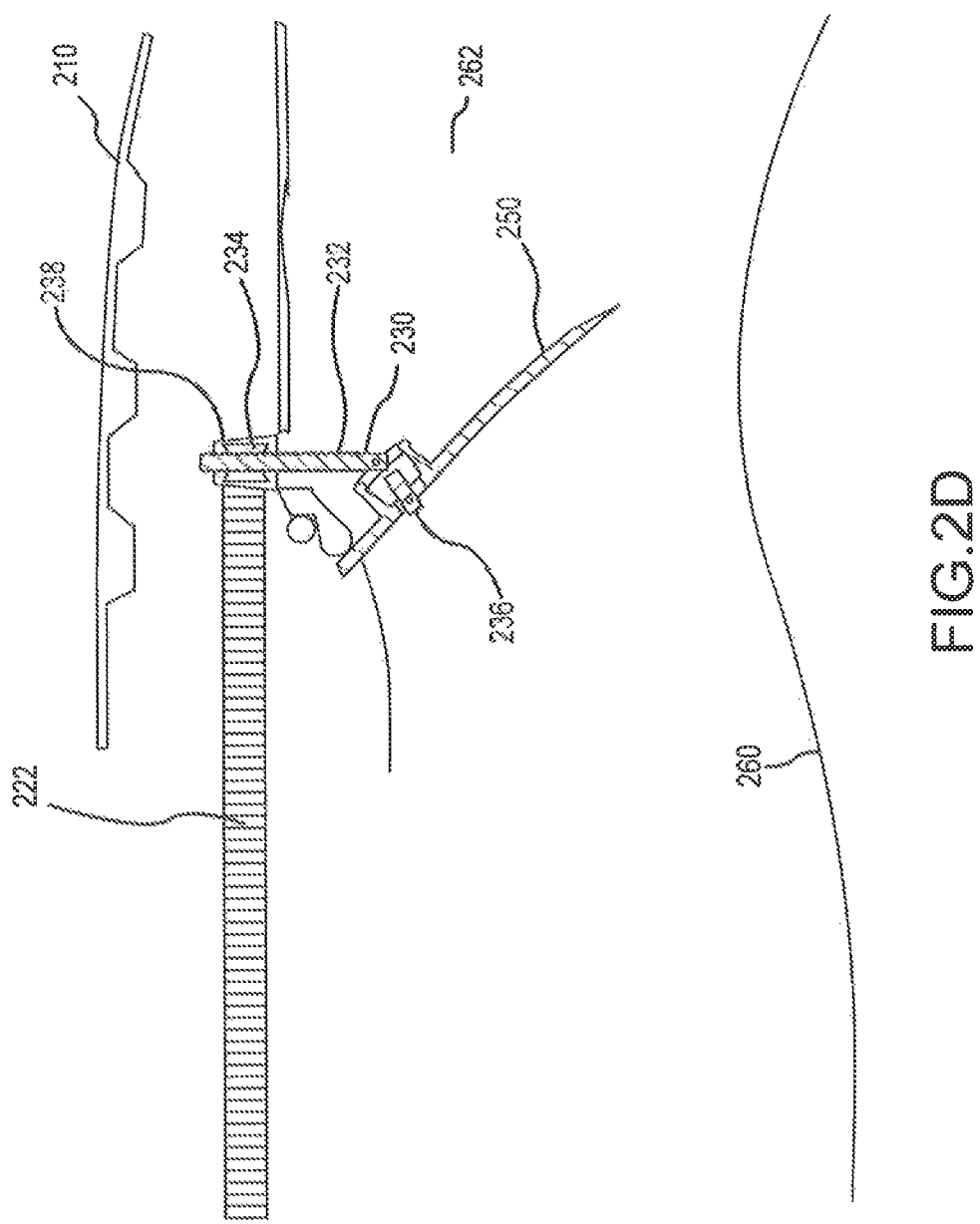

In various embodiments and with reference to FIGS. 2A-2D, activation of the thrust reverser system causes translating sleeve 210 to move aft to expose the cascade 220. In this regard, nacelle 200 may be configured to split such that translating sleeve 210 separates from the fan cowl of nacelle 200 to expose one or more cascades 220, as shown in FIG. 2A. In response to translating sleeve 210 being moved aft, blocker door 250 may be actuated from a stowed position (as shown in FIG. 2B) into fan air duct 262 (as shown in FIGS. 2C-2D) directing a portion of the air passing through fan air duct 262 through cascade 220. This air may provide reverse thrust to slow an aircraft during landing (e.g., after touchdown).

In various embodiments, blocker door 250 may be rotated or translated into fan air duct 262 by a blocker door actuation system 230. During operation of the thrust reverser system, translating sleeve 210 may translate aft causing blocker door system 230 to translate of on rack 222. In this regard, translation aft of translating sleeve 210 causes gear 234 to rotate and move aft along rack 222. The rotation of gear 234 about screw shaft 232 causes screw shaft 232 to translate inward along its threads (e.g., toward the centerline A-A' and/or toward the IFS 260).

In various embodiments, link 236 may couple and/or pivotally attach blocker door actuation system 230 to blocker door 250. Link 236 may pivotally couple to blocker door 250. In this regard, link 236 may be pinned or otherwise pivotally attached to blocker door 250.

In various embodiments, link 236 may attach to blocker door 250 at any suitable location. Link 236 may be attached to a forward portion of blocker door 250. In this regard, link 236 may be position at a point on blocker door 250 to suitably minimize and/or reduce the total travel of screw shaft 232 required to actuate blocker door 250 into fan air duct 262. For example, link 236 may be pivotally coupled to and/or attached to at: (1) a mid-point along the width of blocker door 250 and/or (2) at a point along approximately the forward first ¼ to ½ of the length of blocker door 250.

In various embodiments and during thrust reverser operation, translating sleeve 210 may translate aft nacelle 200 exposing cascade 220. Air may be directed by blocker door 250 through cascade 220 to create a reverse thrust. This air may comprise a radial component and a forward component. Moreover, cascade 220 may be designed and/or shaped with individual air directing cells. These individual air directing cells may be configured to direct air away from aircraft control surfaces (e.g., flaps and/or other surfaces on the airframe).

In various embodiments, and with specific reference to FIG. 2B-2D, blocker door 250 may be translated by blocker door actuation system 230 to any suitable point. For example, blocker door 250 may be translated such that it obstructs a portion of fan air duct 262. In this regard, a portion of the air traveling through fan air duct 262 may be directed through cascade 220. A portion of the air may also be directed through fan air duct 262 may be allowed to pass by blocker door 250. This gap or partial inhibition in the flow area of the fan air duct 262 may be configured and/or sized to allow cooling air pass by blocker door 250 to cool engine components during a landing event (e.g., after touchdown). Moreover, this partial obstruction of fan air duct 262 may be designed to avoid engine surge or provide an area match, such that air from fan air duct 262 is adequately distributed through cascade 220 and past blocker door 250.

In various embodiments, the blocker door actuation systems and apparatuses described herein may be employed with any suitable nacelle, engine, and/or thrust reverser system.

Thus, in various embodiments, the blocker door actuation systems and apparatuses described herein may improve the aerodynamic efficiency of a fan air duct and minimize noise created in the nacelle.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed is:

1. A thrust reverser system, comprising:
   a translating sleeve;
   a blocker door actuation system comprising,
      a gear,
      a threaded shaft rotatably received within the gear,
   a rack mounted to a cascade and configured to provide a travel path for the gear; and
   a blocker door rotatably coupled to the threaded shaft, wherein the blocker door is actuated from a stowed position to a deployed position in response to the translating sleeve moving aft, wherein the threaded shaft is configured to translate substantially perpendicular to a centerline of the thrust reverser system in response to the translating sleeve moving aft.

2. The thrust reverser system of claim 1, further comprising a gear housing.

3. The thrust reverser system of claim 2, wherein the translating sleeve comprises and inner sleeve and an outer sleeve.

4. The thrust reverser system of claim 3, wherein the gear housing is coupled to the inner sleeve.

5. The thrust reverser system of claim 1, further comprising a cascade and a rack, the rack being at least one of integrally formed in and coupled to the cascade.

6. The thrust reverser system of claim 5, wherein the gear rotatably translates along the rack in response to the translating sleeve moving aft.

7. The thrust reverser system of claim 1, wherein the gear is a pinion gear.

8. The thrust reverser system of claim 1, wherein the blocker door actuation system comprises a link, and wherein the link is coupled to the blocker door on a forward portion of the blocker door.

9. The thrust reverser system of claim 1, wherein the blocker door actuation system comprises a link, and wherein the link is coupled to a blocker door to minimize the travel required to translate the blocker door from the stowed position to the deployed position.

10. An aircraft nacelle, comprising:
    a translating sleeve;
    a blocker door actuation system comprising a gear and a screw shaft, the screw shaft oriented perpendicular to a centerline of the aircraft nacelle, the blocker door actuation system coupled to the translating sleeve;
    a rack configured to rotatably guide the gear; and
    a blocker door operatively coupled to the blocker door actuation system and configured to translate from a stowed position to a deployed position in response to the translating sleeve moving aft.

11. The aircraft nacelle of claim 10, wherein the blocker door actuation system further comprises a link comprising a first end and a second end.

12. The aircraft nacelle of claim 11, wherein the first end of the link is rotatably coupled to the screw shaft.

13. The aircraft nacelle of claim 11, wherein the second end of the link is rotatably coupled to the blocker door.

14. The aircraft nacelle of claim 10, wherein the translating sleeve comprises an inner sleeve and an outer sleeve, the translating sleeve defining a chamber between the inner sleeve and the outer sleeve that is configured to house a cascade in the stowed position.

15. The aircraft nacelle of claim 14, wherein the blocker door actuation system further comprising a gear housing configured to house the gear.

16. The aircraft nacelle of claim 15, wherein the gear housing is fixed to the inner sleeve.

17. A blocker door actuation system, comprising:
    a rack coupled to a cascade in a thrust reverser;
    a gear configured to rotatably translate along the rack;
    a gear housing configured to house the gear;
    a screw shaft threadably installable within the gear and configured to translate within the gear in response to gear translating along the rack, wherein the screw shaft is oriented perpendicular to the rack; and
    a link rotatably coupled to a blocker door and coupled to the screw shaft.

18. The blocker door actuation system of claim 17, wherein the gear housing is attached to a translating sleeve.

* * * * *